(12) United States Patent
Lysko

(10) Patent No.: US 9,037,798 B2
(45) Date of Patent: May 19, 2015

(54) SYSTEM AND METHOD OF OPERATING A COMPUTING DEVICE TO PERFORM MEMOIZATION INCLUDING TRANSFORMING INPUT/OUTPUT PARAMETERS TO REDUCE REDUNDANCIES AND EFFICIENTLY CACHE DATA

(75) Inventor: Albert Anatolievich Lysko, Pretoria (ZA)

(73) Assignee: CSIR, Pretoria (ZA)

( * ) Notice: Subject to any disclaimer, the term of this patent is extended or adjusted under 35 U.S.C. 154(b) by 711 days.

(21) Appl. No.: 13/133,880

(22) PCT Filed: Dec. 10, 2009

(86) PCT No.: PCT/IB2009/055650
§ 371 (c)(1),
(2), (4) Date: Aug. 25, 2011

(87) PCT Pub. No.: WO2010/067324
PCT Pub. Date: Jun. 17, 2010

(65) Prior Publication Data
US 2011/0302371 A1 Dec. 8, 2011

(30) Foreign Application Priority Data
Dec. 10, 2008 (ZA) .................. 2008/10479

(51) Int. Cl.
*G06F 12/08* (2006.01)
*G06F 1/035* (2006.01)
*G06F 17/10* (2006.01)

(52) U.S. Cl.
CPC .............. *G06F 1/0353* (2013.01); *G06F 12/08* (2013.01); *G06F 17/10* (2013.01)

(58) Field of Classification Search
None
See application file for complete search history.

(56) References Cited

U.S. PATENT DOCUMENTS

| | | | |
|---|---|---|---|
| 5,260,898 A | 11/1993 | Richardson | 708/490 |
| 5,940,619 A * | 8/1999 | Abadi et al. | 717/156 |
| 5,987,254 A * | 11/1999 | Subrahmanyam | 717/155 |
| 6,513,106 B1 | 1/2003 | Lau | 711/221 |
| 6,553,394 B1 * | 4/2003 | Perry et al. | 708/200 |
| 2009/0049421 A1 * | 2/2009 | Meijer et al. | 717/100 |

FOREIGN PATENT DOCUMENTS

GB  2 320 995  7/1998

OTHER PUBLICATIONS

Alvarez et al, "Fuzzy Memoization for Floating-Point Multimedia Applications," IEEE Transactions on Computers, vol. 54, No. 7, Jul. 2005, pp. 922-927.*
Acar et al, "Selective Memoization," Proceedings of the 30th ACM SIGPLAN-SIGACT Symposium on Principles of Programming Languages (POPL), 2003, pp. 14-25.*
ISR for related PCT/IB2009/055650 mailed on Apr. 27, 2010.
IPRP for related PCT/IB2009/055650 completed on Feb. 7, 2011.

* cited by examiner

*Primary Examiner* — Sanjiv Shah
*Assistant Examiner* — Glenn Gossage
(74) *Attorney, Agent, or Firm* — Ladas & Parry, LLP

(57) ABSTRACT

A system (200) and a method (100) of operating a computing device to perform memoization are disclosed. The method includes determining whether a result of a function is stored in a cache and, if so, retrieving the result from the cache and, if not, calculating the result and storing it in the cache. The method (100) includes transforming (104) by the computing device at least one selected from the input parameters and the output parameters of the function, the transforming being based on an analysis of the function and its input arguments to establish whether or not there is a possible relationship reflecting redundancy among the input parameters and output parameters of the function. The transforming may include at least one of: use of symmetry, scaling, linear shift, interchanging of variables, inversion, polynomial and/or trigonometric transformations, spectral or logical transformations, fuzzy transformations, and systematic arrangement of parameters.

10 Claims, 3 Drawing Sheets

SYSTEM AND METHOD OF OPERATING A COMPUTING DEVICE TO PERFORM MEMOIZATION INCLUDING TRANSFORMING INPUT/OUTPUT PARAMETERS TO REDUCE REDUNDANCIES AND EFFICIENTLY CACHE DATA

CROSS-REFERENCE TO RELATED APPLICATIONS

This application is the U.S. National Stage of International Patent Application No. PCT/IB2009/055650 filed on Dec. 10, 2009 which claims priority to South African Patent Application No. 2008/10479 filed on Dec. 10, 2008, disclosures of which are hereby incorporated by references in their entireties.

FIELD OF INVENTION

This invention relates to memoization, and specifically to a method and system of operating a computing device to perform memoization including transforming input/output parameters to reduce redundancies and efficiently cache data.

BACKGROUND OF INVENTION

A cache is a temporary memory storage area functioning as a lookup table where data w hick is assumed to be accessed frequently can be stored, for high-speed access. Conceptually, such a cache maps between a set of output parameters (e.g., the data itself) and a set of input parameters (e.g., an address or identifier of the data). Once the data is stored in the cache, it can be accessed and retrieved more quickly than by fetching or calculating the original data from the original source. Caching therefore saves time by storing a limited amount of frequently accessed data in a nearby or high-speed memory.

Memoization applies the theory of a cache to programming, logical or numerical functions. Thus, instead of recalculating the result of a function, a previously calculated result can be used when the input parameters are the same. Memoization finds particular application in computer programs and applications which calculate memory- or processor-intensive functions.

The Inventor desires an improved method for memoization.

SUMMARY OF INVENTION

According to one aspect of the invention, there is provided a method of operating a computing device to perform memoization, the method including determining whether or not a result of a function is stored in a cache and, if so, retrieving the result from the cache and, if not, calculating the result and storing it in the cache, wherein the method includes:

transforming by the computing device at least one selected from the group composed of the input parameters and the output parameters of the function, the transforming being based on an analysis of the function and its input arguments to establish whether or not there is a possible relationship among and between the input parameters and output parameters of the function, the relationship reflecting redundancy.

The method may include transforming the output parameters only. The method may include transforming the input parameters only.

Instead, the method may include transforming both the input parameters and the output parameters of the function. In such case, transforming the output parameters may be used to compensate for the transformation of the input parameters.

Transforming the input parameters may include pre-processing of the input parameters. The purpose of transforming the input parameters may be to decrease a number of records stored in the cache, by considering redundancy-related properties inherent in some functions. Differently stated, many mathematical or scientific functions include properties that may generate repetitive or redundant elements and the purpose of transforming the function or its arguments may be to make use of these repetitive or redundant elements to optimize computations and storage. Transforming the input parameters may include at least one selected from the group composed of symmetry consideration(s), scaling (including simple change of sign), linear shift, interchanging of variables, inversion, polynomial and/or trigonometric transformations, spectral transformations (including various forms of Fourier, Laplace and wavelet transformations), logical transformations, fuzzy transformations, data compression and decompression.

For example, if $f(x)=f(-x)$, it is not necessary to store results for both $f(x)$ and $f(-x)$. Instead, the results of only one function, e.g. $f(x)$, may be stored and transforming the input parameters may then include converting the sign of the argument of $f(-x)$ so that the results of $f(x)$ can be used from the cache.

The transforming may include bringing the parameters to a desired systematic arrangement (thereby helping to identify or use/reuse the cache elements more efficiently).

A complex function may be split into a plurality of sub functions. The input and output parameters may then relate to the individual sub functions or a combination thereof, thus conceptually being intermediate parameters with respect to the original complex function.

For example, a function $$f(x, y) = \int_{-1}^{x} e^{\cos z}\, dz + \int_{0}^{y} e^{\sin} dz$$

may be memorized more effectively by memorizing the two terms separately.

A decrease in the number of records stored in the cache by appropriate manipulating of the input and output parameters and/or taking advantage of redundancies may decrease a size of the cache and/or decrease steps or iterations to find a matching record, thereby improving efficiency of the cache.

The input parameters and/or the output parameters may be transformed in accordance with predefined transformation criteria, specific to the application, task and/or computed function. The input and output parameters may be represented as scalars, vectors, matrixes, tensors, individually or as a combination thereof, or the like.

The method may include storing in the cache an indication of how the input parameters were transformed, if relevant. The method may include storing in the cache an indication of how the output parameters can be transformed. The method may include storing in the cache an indication of a relationship between the input parameters and the output parameters. The method may include storing additional information including a time stamp (if the transformation was applied to the data before it was cached).

Similarly, transforming the output parameters may include at least one selected from the group composed of utilization/ application of symmetry, scaling, linear shift, interchanging of variables, inversion, polynomial and/or trigonometric transformations, and spectral transformations, logical transformations, fuzzy transformations, data compression and decompression.

In the method, the function may be used to calculate a system of equations, matrix, tensor or vector elements, and in such case, transforming the input parameters and/or the output parameters may include defining a specific order, in which the equations or elements of the matrix, tensor, or vector are calculated, thereby to optimize memoization.

The method may find application in calculating functions which are relatively resource-intensive (e.g. in the fields of computational electromagnetics, fluid dynamics, etc.).

The method may include the prior step of:
analyzing input parameters of the function to establish whether or not there is a possible relationship reflecting redundancy among the input parameters and/or output parameters.

The invention extends to a system for memoization, the system including:
a computing device; and
a computer-readable medium defining a cache and having stored thereon a set of instructions configured to direct the operation of the computing device such that the computing device is operable to determine whether or not a result of a function is stored in the cache and, if so, to retrieve the result from the cache and, if not, to calculate the result and store it in the cache, wherein the computing device is further operable to:
transform at least one selected from the group composed of the input parameters and the output parameters of the function, the transforming being based on an analysis of the function and its input arguments to establish whether or not there is a possible relationship among and between the input parameters and output parameters of the function, the relationship reflecting redundancy.

Examples of input parameters may include arguments, variables, constants, and the like. Examples of output parameters may include results, functions, values, and the like.

The system need not necessarily be consolidated into one device, but may be distributed and/or networked among a number of devices. Similarly, the computer-readable media need not necessarily be consolidated into one component, but may be distributed and/or networked among a number of components.

The invention extends further to a computer-readable medium having stored thereon a set of instructions which, when executed by a computing device, causes the computing device to perform a method as defined above.

BRIEF DESCRIPTION OF DRAWINGS

The invention will now be further described, by way of example, with reference to the accompanying diagrammatic drawings.

In the drawings:
FIGS. 3a-3d show a schematic representation of a plurality of matrices calculated in accordance with the method of FIG. 1.

DETAILED DESCRIPTION OF EXAMPLE EMBODIMENT

Figure 1:
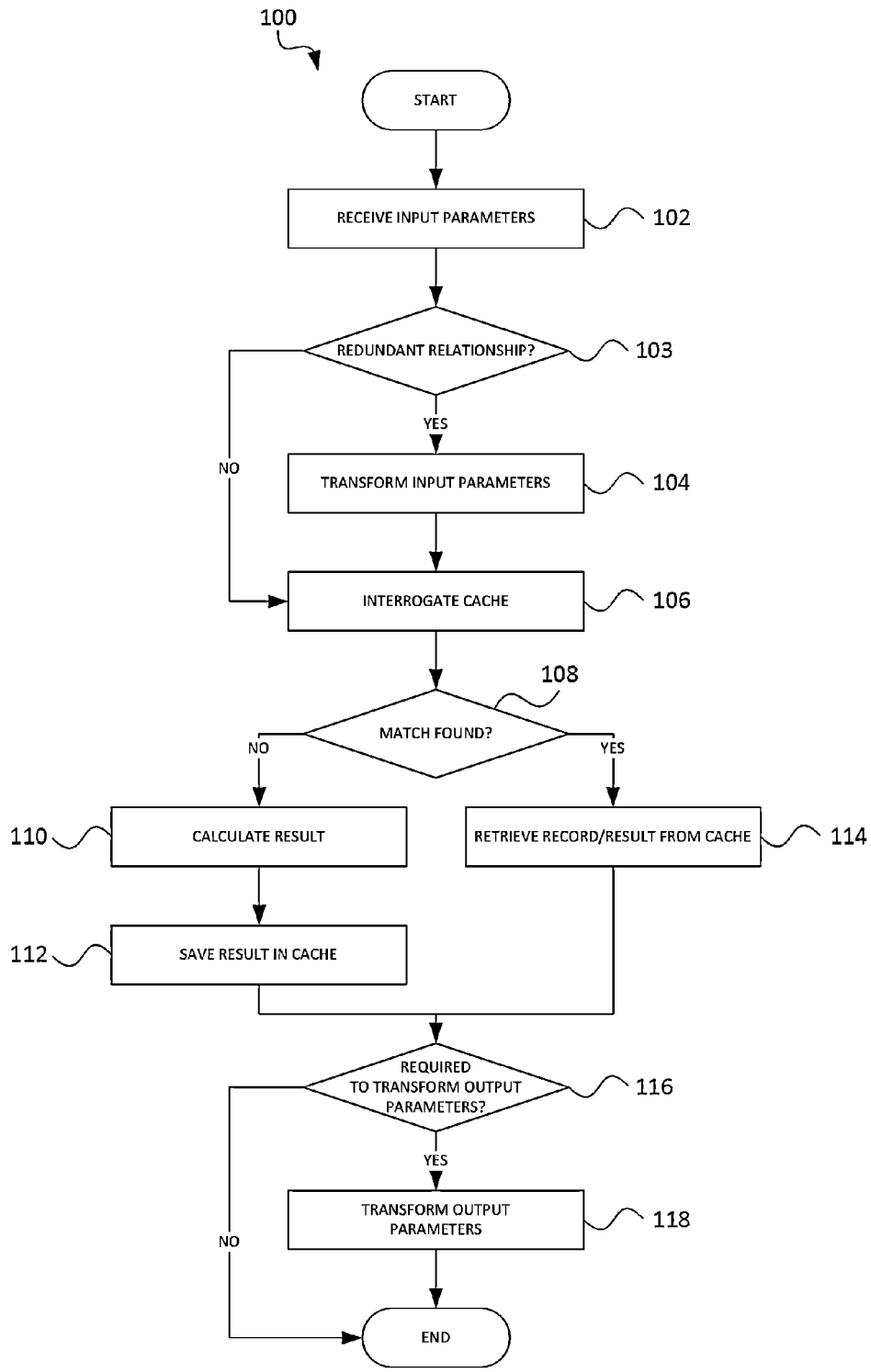
FIG. 1 shows a flow diagram of a method of operating a computing device to perform memoization, in accordance with the invention.

With reference to FIG. 1, reference numeral 100 generally indicates a flow diagram of a method of operating a computing device to perform memoization, in accordance with the invention.

The method 100 includes analyzing or interrogating the input parameters of the function to establish, at block 103, whether or not there is a possible relationship reflecting redundancy among/between the input parameters and output parameters and, if so, the input parameters are transformed, at block 104. (This step of analysis may also be done beforehand by a human.) This may be done in a number of ways and examples of this are further described below. The transformation of the input parameters takes into account redundant or repetitive characteristics of the function with respect to the input and/or output parameters, the characteristics such as symmetry consideration(s), possibility of scaling (including change of sign), linear shift, interchangeability of variables, inversion, polynomial and/or trigonometric transformations, spectral transformations (including various forms of Fourier, Laplace and wavelet transformations), logical and/or fuzzy relationship(s), and any combination thereof. Through the transformation, the input parameters (or arguments) may then be brought to an intermediate form identifiable with respect to the output result(s) (i.e. the output parameters).

The method 100 includes analysing or interrogating the input parameters of the function to establish, at block 103, whether or not there is a possible relationship reflecting redundancy among/between the input parameters and output parameters and, if so, the input parameters are transformed, at block 104. (This step of analysis may also be done beforehand by a human.) This may be done in a number of ways and examples of this are further described below. The transformation of the input parameters takes into account redundant or repetitive characteristics of the function with respect to the input and/or output parameters, the characteristics such as symmetry consideration(s), possibility of scaling (including change of sign), linear shift, interchangability of variables, inversion, polynomial and/or trigonometric transformations, spectral transformations (including various forms of Fourier, Laplace and wavelet transformations), logical and/or fuzzy relationship(s), and any combination thereof. Through the transformation, the input parameters (or arguments) may then be brought to an intermediate form identifiable with respect to the output result(s) (i.e. the output parameters).

Next, the cache is interrogated, at block 106 to determine, at block 108, whether or not the intermediate parameters can be matched to parameters stored in the cache, possibly including comparison(s) of additional flags or criteria. If matched, the record possibly including the result, possibly including additional information is retrieved, at block 114, from the cache. If not, the result is calculated, at block 110, and saved, possibly with additional information, at block 112, in the cache. It is then determined, at block 116, whether or not it is required to transform output parameters and, if so, the output parameters are transformed, at block 118, accordingly.

EXAMPLE 1

If, for example, $f(a,b)=f(b,a)$, it can be said that the input parameters of the function $f$ are interchangeable. To minimize the number of functions stored within the cache thereby to optimize the use of the cache, the variables of the functions are transformed in accordance with the transformation criteria, which in this case indicate that they must be transformed and ordered in, for instance, increasing numerical order (increasing with the position of the argument). Thus, if it is desired to calculate the result of $f(2,1)$, the variables or inputs are transformed to $f(1,2)$. As this is the first iteration, $f(1,2)$ has not previously been calculated and therefore it is calculated, at block 110 and saved, at block 112 in the cache; the result is the same as it is for $f(2,1)$. In the future, if either $f(1,2)$ or $f(2,1)$ need to be calculated, the result can simply be retrieved, at block 114, based on the result of $f(1,2)$. In this example, no output parameter transformation is required.

EXAMPLE 2

It may be that when bounds of an integral are interchanged, the result has the same absolute value but a different sign, i.e.

$$\int_b^a f(x)dx = -\int_a^b f(x)dx.$$

In this example, the output criteria dictate that the lower numerical number of a and b must be transformed, if not already there, to the lower bound of the integral and, correspondingly, that the higher number must be transformed, also if not already there, to the upper bound of the integral. Thus, in the first iteration of the method 100, $$\int_3^4 f(x),$$

for example, is to be calculated. For the specific iteration, no transformation need be done and the result is calculated and saved, at blocks 110, 112. In the next iteration, however, $$\int_4^3 f(x)$$

is to be calculated. The input parameters, e.g. the bounds of the integral, are now interchanged in accordance with the defined convention and the result of $$\int_3^4 f(x)$$

can then be retrieved from the cache 114 where it was stored in the first iteration. However, in this example, it is necessary also to transform, at block 118, the output parameters in that the sign of the result needs to be changed. Thus, also stored in the cache 114 along with the result may be associated details of required output parameter transformation, and determining whether or not output parameter transformation is required, at block 116, may include reading this from the cache. Alternatively, it could be determined based on the nature of the input parameter transformation.

EXAMPLE 3

If the function includes a system of equations or a matrix (e.g. $A \cdot x = B$), transforming the input parameters may include defining a specific order in which the equations or elements of the matrix are calculated, thereby to optimize memoization.

Figure 3:
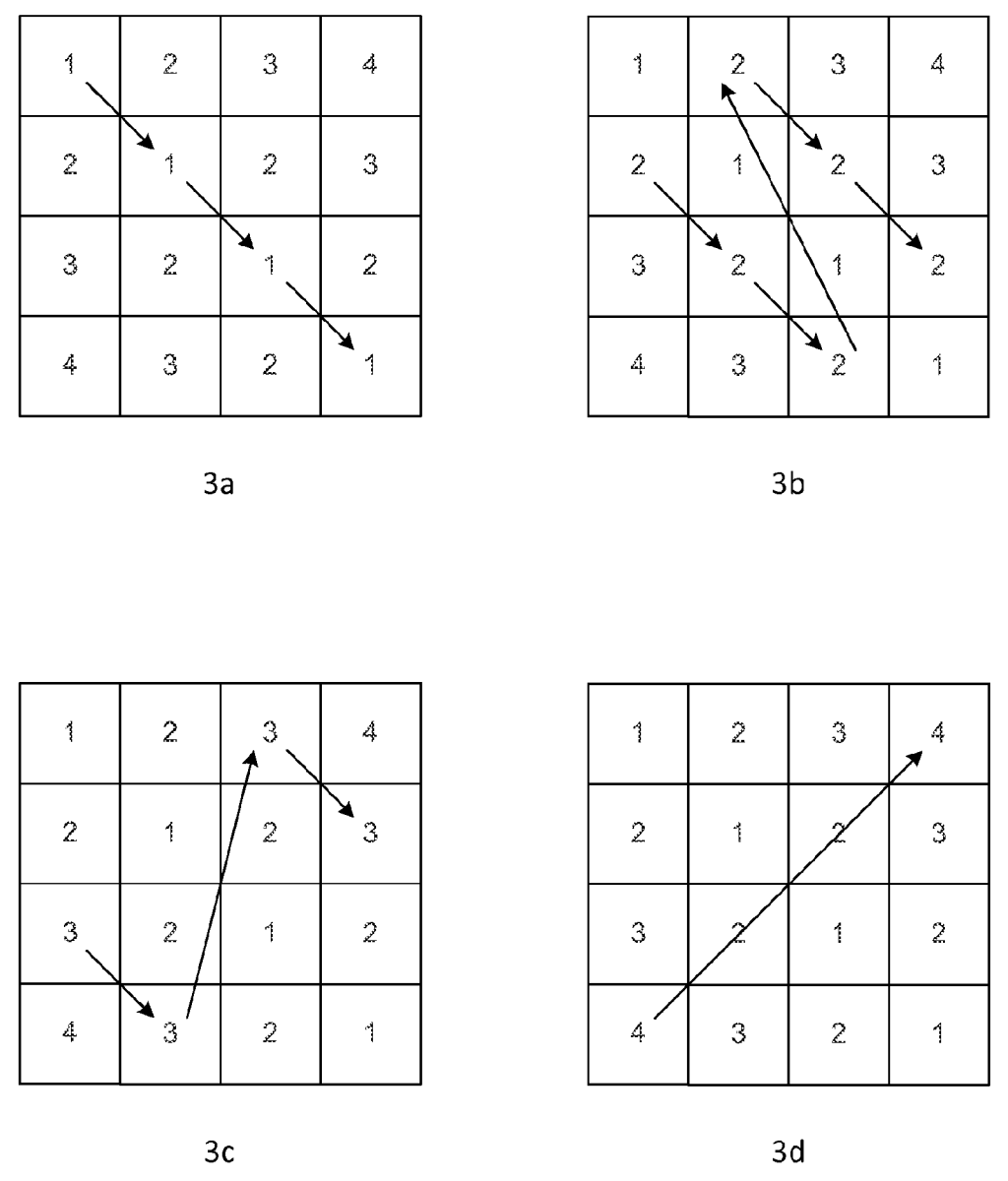

The matrix illustrated in FIG. 3 is symmetrical with respect to the main diagonal and so is a Toeplitz matrix. Conventional computerized processing of matrix elements typically includes processing elements in a predefined, fixed order, typically row-wise (from the beginning of one row to the end and then repeating the process from the following rows) or column-wise. However, in accordance with the invention, the elements of the matrix are processed in an order which groups similar or equivalent input parameters or expected output parameters together. This matrix is processed in the order indicated by arrowed lines in FIGS. 3a-3d, so that more efficient use may be made of the memoization in that elements of the matrix with the same result can be addressed and calculated (if necessary) and retrieved from the cache successively and more efficiently.

The exact order of following the arrowed lines in FIG. 3 may be different from the one illustrated and may be specific to a particular programming language and its realization on a particular computer platform (platform-dependent). It may help to increase the efficiency even further by accessing the computer memory in a manner minimizing the distance in memory between the called matrix elements in order to improve the efficiency of utilizing the computing device (including processor and/or motherboard) caches. Also, it is possible to store the matrix elements in an order minimizing the distance in memory between the consequently called elements.

For example, FORTRAN and C store rectangular matrices differently (FORTRAN stores column-wise, whilst C stores row-wise). If a column-wise approach is used, it may be beneficial to try to group the calling of matrix elements from the same or neighboring columns.

More specifically, in the example of the method of moments (or related methods, e.g. the boundary element method), an integral equation with a boundary condition defined on a geometric structure is transformed into a set of linear algebraic equations. The elements of the resulting N×N matrix are integrals. Usually these are double, triple or quadruple integrals, and are computed using numerical quadratures. Accurate evaluation of these integrals is time-consuming and the higher the degree of accuracy required, the more time is required. Many practical geometric structures, and types of mesh applied to the structure, result in a plurality of the same or similar geometric mesh elements. The same combinations of these geometrical elements produce integrals with the same result. Thus, similarities in the geometric combinations may be recognized in a few simple steps. Then, the integrals need to be calculated once only (for each combination) and the already computed values may be used thereafter instead of performing the time-consuming calculation repeatedly. Under ideal circumstances, the number of integral evaluations can be reduced from $N^2$ to N.

EXAMPLE 4

Redundancy Provided by the Geometrical Elements

A method of moments is often applied to wire structures for the purpose of establishing the properties of resultant electromagnetic radiation. A basic element in the matrix, forming a part of the system of linear algebraic equations, is a weighted moment. It expresses the interaction between the basis geometrical elements, i.e. wire segments. In this example, for simplicity and demonstration purposes, only wire segments that are both thin compared to the wavelength and long compared to their radius are being considered.

One of the ways to describe the geometry of this problem is to state the radius of each wire segment and the three-dimensional coordinates of the beginning and the end. Following this example, the matrix element can be expressed as a double integral with the integrand dependent only on the distance between the points on the wire segments.

The input parameters to such a function computing interaction between a pair of wire segments, can be represented by:

3 coordinates for the beginning of the first wire;
3 coordinates for the end of the first wire;
3 coordinates for the beginning of the second wire;
3 coordinates for the end of the second wire; and
2 scalars for radii of the two wires.

As no two wires can occupy the same space, this set of input parameters cannot take advantage of the redundancies. The redundancy elements come from the fact that the integrand depends on the distance between the points rather than on the absolute coordinates. Thus, another, mathematically equivalent set of parameters can be introduced:

Length of the first wire;
length of the second wire;
distance between the beginning of the first wire and the beginning of the second wire;
distance between the beginning of the first wire and the end of the second wire;
distance between the end of the first wire and the beginning of the second wire;
distance between the end of the first wire and the end of the second wire; and
2 scalars for radii of the two wires.

Another aspect in utilizing the redundancy properties in this example is that:

the two wires can be interchanged (with appropriate interchange in the distances between the respective ends of the wires); and
the numbering of the ends of the wires can be interchanged.

Each of these two redundancies permits a reduction of the storage space required in the cache by a factor of two. Taking advantage of such redundancies becomes possible when the original geometrical structure is divided into basic elements that are similar.

Figure 2:
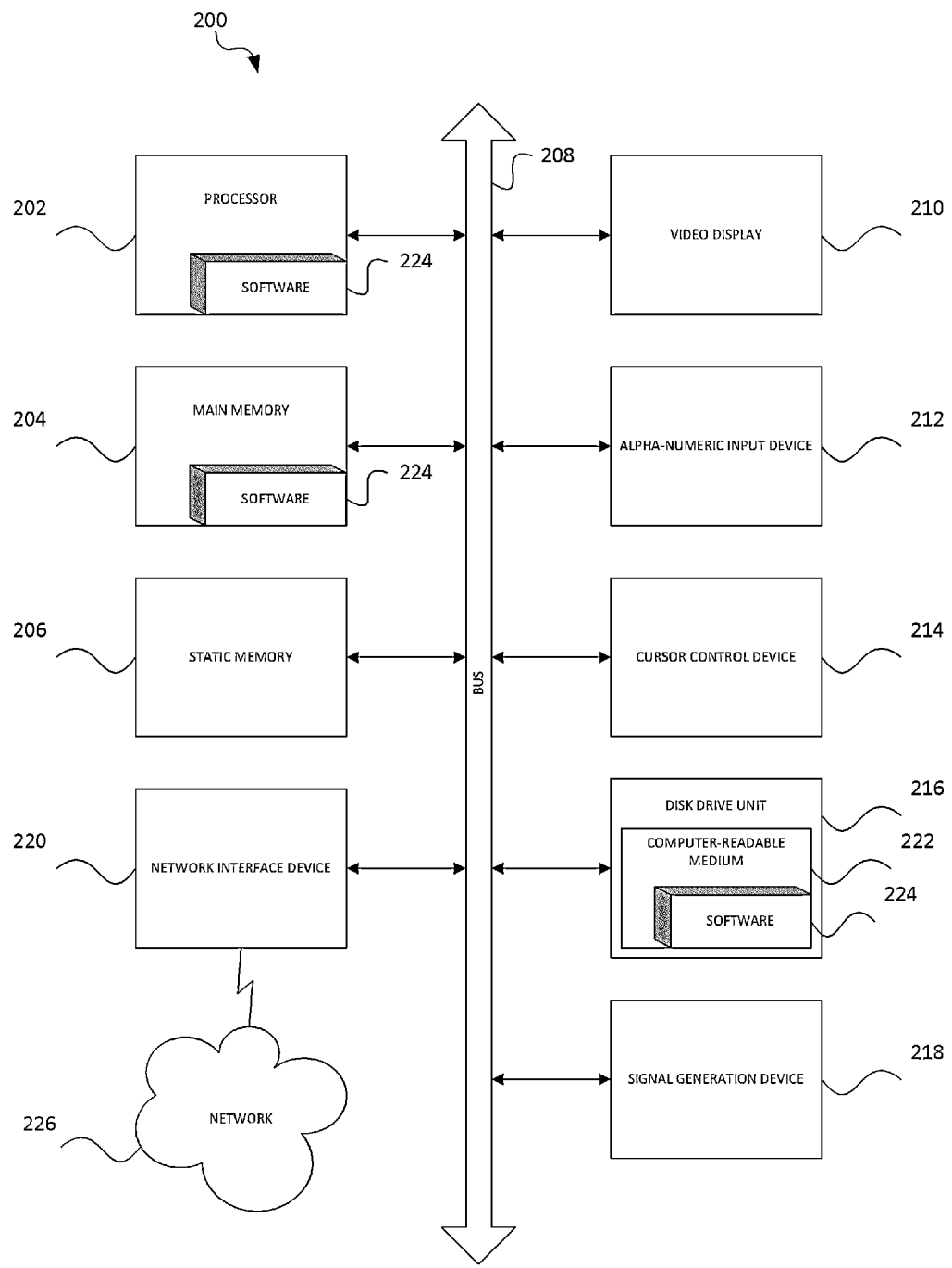
FIG. 2 shows a schematic view of a system for memoization in accordance with the invention.

FIG. 2 illustrates an example computer system 200 which includes a computing device, e.g. a processor 202 (e.g., a central processing unit (CPU), a graphics processing unit (GPU) or both), a main memory 204 and a static memory 206, which communicate with each other via a bus 208. The computer system 200 may further include a video display unit 210 (e.g., a liquid crystal display (LCD), a plasma display, or a cathode ray tube (CRT)). The computer system 200 may also include an alphanumeric input device 212 (e.g., a keyboard), a user interface (UI) navigation or cursor control device 214 (e.g., a mouse), a disk drive unit 216, a signal generation device 218 (e.g., a speaker) and a network interface device 220.

The disk drive unit 216 includes a computer-readable medium 222 on which is stored one or more sets of instructions and data structures (e.g., software 224) embodying or utilized by any one or more of the methodologies or functions described herein. The software 224 may also reside, completely or at least partially, within the main memory 204 and/or within the processor 202 during execution thereof by the computer system 200, the main memory 204 and the processor 202 also constituting computer-readable media.

The software 224 may further be transmitted or received over a network 226 via the network interface device 220 utilizing any one of a number of well-known transfer protocols (e.g., hyper-text transfer protocol (HTTP), Ethernet, inter-integrated circuit ($I^2C$)).

While the computer-readable medium 222 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the computer and that cause the computer to perform any one or more of the methodologies of the present embodiments, or that is capable of storing, encoding or carrying data structures utilized by or associated with such a set of instructions. The term "computer-readable medium" shall accordingly be taken to include, but not be limited to, solid-state memories, and optical and magnetic media.

The computer system 200 may be programmed to implement the method 100 of FIG. 1, but it is to be appreciated that the method 100 may be applied to other systems also.

The method 100 of memoization could also be implemented using a stand-alone device, or part of another physical device, or could be software-based.

The Inventor believes that the invention as exemplified provides an enhanced method 100 of memoization which provides improved performance compared with conventional memoization in that inherent redundancies of functions are not only considered but exploited.

The invention claimed is:

1. A method of operating a computing device having a non-transitory computer-readable medium comprising a cache, wherein the computing device is operated to perform memoization with respect to a function having a relationship reflecting redundancy among at least one selected from the group composed of its input parameters and its output parameters, wherein the function is used to calculate a system of equations or matrix elements, tensor elements, or vector elements, and wherein the method includes operating the computing device to:

transform the input parameters;
retrieve from the cache the output parameters, if present, based on the transformed input parameters; and
transform the output parameters which includes defining a specific order in which the system of equations or the elements of the matrix, tensor, or vector are calculated, thereby to optimize memoization; wherein the transforming of the output parameters compensates for the transformation of the input parameters.

2. A method as claimed in claim 1, wherein transforming the input parameters includes pre-processing of the input parameters.

3. A method as claimed in claim 1, wherein transforming the input parameters includes at least one selected from the group composed of utilization/application of symmetry, scaling, linear shift, interchanging of variables, inversion, polynomial and/or trigonometric transformations, spectral transformations, logical transformations, fuzzy transformations, data compression and data decompression.

4. A method as claimed in claim 1, wherein transforming the parameters includes bringing the parameters to a desired systematic arrangement.

5. A method as claimed in claim 1, further comprising storing in the cache an indication of how the input parameters were transformed.

6. A method as claimed in claim 1, wherein transforming the output parameters includes at least one selected from the group composed of utilization/application of symmetry, scaling, linear shift, interchanging of variables, inversion, polynomial and/or trigonometric transformations, and spectral transformations, logical transformations, fuzzy transformations, data compression and decompression.

7. A method as claimed in claim 1, further comprising storing in the cache an indication of how the output parameters are transformed.

8. A method as claimed in claim 1, further comprising storing in the cache an indication of the relationship between the input parameters and the output parameters.

9. A system for memoization, the system including:
a computing device;
a non-transitory computer-readable medium comprising:
a cache; and
a computer program configured to direct the operation of the computing device such that the computing device is operable to perform memoization with respect to a function having a relationship reflecting redundancy among at least one selected from the group composed of its input parameters and its output parameters, wherein the function is used to calculate a system of equations or matrix elements, tensor elements, or vector elements, and wherein the computing device is operable to:
transform the input parameters;
retrieve from the cache the output parameters, if present, based on the transformed input parameters; and
transform the output parameters which includes defining a specific order in which the system of equations or the elements of the matrix, tensor, or vector are calculated, thereby to optimize memoization; wherein the transforming of the output parameters compensates for the transformation of the input parameters.

10. A non-transitory computer-readable medium having stored thereon a computer program which, when executed by a computer, causes the computer to perform the method as claimed in claim 1.

* * * * *